July 11, 1967     O. CARLSON     3,330,382
PLATFORM FOR VEHICLE LIFTS
Filed July 26, 1965     2 Sheets-Sheet 1
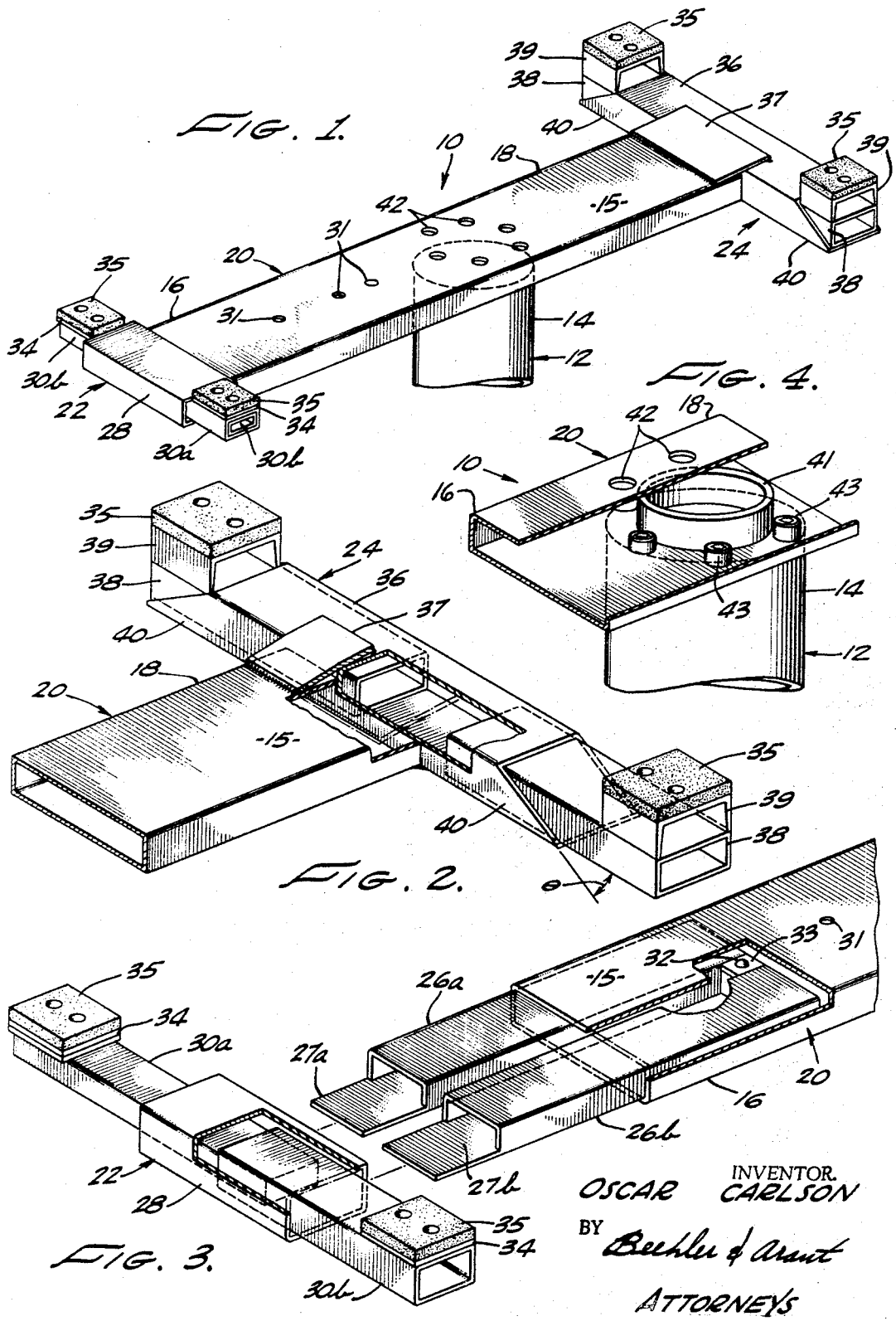
INVENTOR.
OSCAR CARLSON
BY Beehler & Arant
ATTORNEYS July 11, 1967   O. CARLSON   3,330,382
PLATFORM FOR VEHICLE LIFTS
Filed July 26, 1965   2 Sheets-Sheet 2
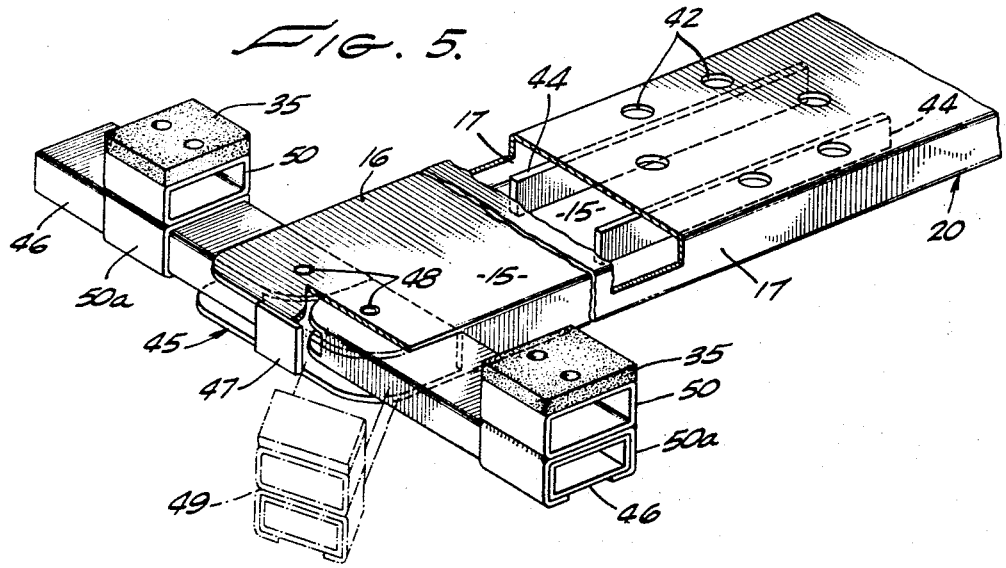
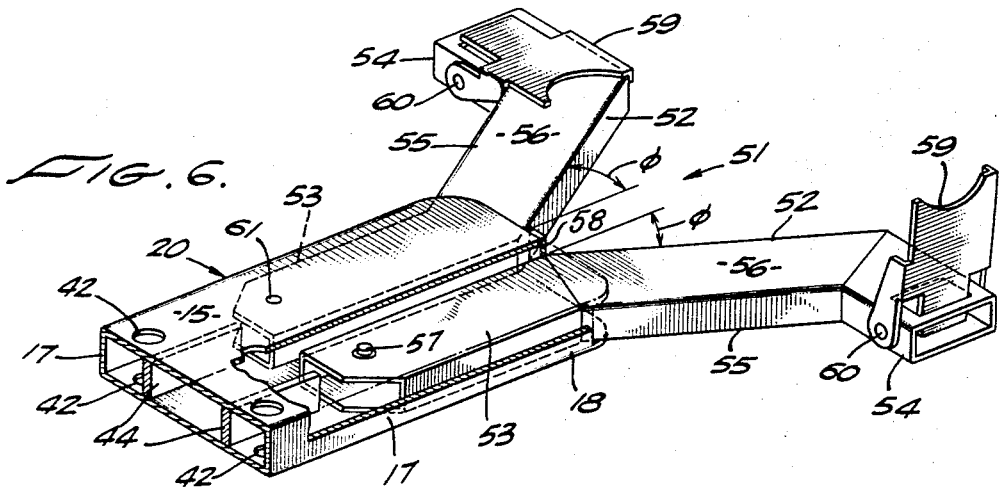
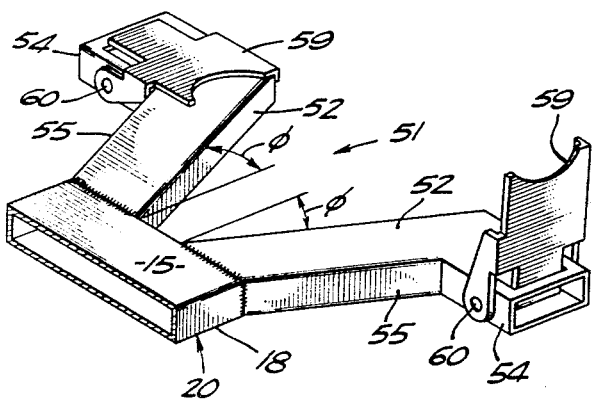
INVENTOR.
OSCAR CARLSON
BY Beehler & Arant
ATTORNEYS

United States Patent Office 3,330,382
Patented July 11, 1967

3,330,382
PLATFORM FOR VEHICLE LIFTS
Oscar Carlson, Bellflower, Calif., assignor to Dixieann Wright and Alfred Strum, as co-executors of the estate of Fern Eileen Meinecke, deceased, doing business as Comwel Company, Lynwood, Calif.
Filed July 26, 1965, Ser. No. 474,735
18 Claims. (Cl. 187—8.75)

This invention relates generally to a vehicle lift and more particularly to a novel rectangular tubular platform for such lifts.

The prior art is replete with automobile hoists of many different types. Some use multiple rams; others raise the vehicle by supporting its frame; still others provide supports under the wheels. All have substantial safety margins by using heavy steel plate and/or structural shapes such as channels, I-beam and the like. In general, such car or vehicle lifts are bulky, of necessity complicated, and presented a high risk of injury to personnel. Prior attempts to reduce this risk by stowing the platform either flush with or below the floor level have, quite understandably, resulted in higher costs both initially and in periodic routine maintenance expenses and have seemingly failed to justify such expenditure.

These disadvantages, however, are obviated by a vehicle lift utilizing a platform constructed in accordance with the invention. In brief, there is provided for attachment to the ram or operating mechanism of a vehicle lift a platform comprising rectangular tubular central or main frame having rectangular tubular supports at each end thereof for supporting the front and rear portions of a motor vehicle. Either or both of these supports may further include telescoping extensions or support members formed accordingly from slightly smaller rectangular tubular stock. As still another variation, depending upon the need, either or both of these tubular sections or extensions may be pivotly mounted in the central or main tubular frame. Conventional flippers or stationary bearing plates may also be provided at the ends of the tubular supports as desired for engaging the frame of a vehicle or some other appropriate point where such vehicle is built with a unitized body. In addition, the rear extension or support members may extend outwardly in Y-like configuration to provide room for the mechanic to service automobiles having rear mounted engines.

This feature of flexibility means that the precise requirements of the user can be fully met and his needless expenditure for equipment having capabilities not needed avoided. The savings in material can also be reflected in his initial costs. Moreover, the user or mechanic is not unnecessarily exposed to critical head injuries, for example, when working under a raised vehicle since the underside of the instant platform is flat and not ragged as generally was the situation heretofore. As still another feature is the ease with which maintenance and repairs can be performed should an occasion ever arise.

According to the invention, there is provided for mounting to the fluid operating mechanism of a vehicle lift a novel platform comprising rectangular tubular frame means having coextending front and rear portions, first tubular support means connected to the frame means at the end of the front portion for supporting a vehicle near the front end thereof, and a second tubular support means connected to the frame means at the end of the rear portion for supporting the vehicle near the rear end thereof.

In another aspect of the invention, there is provided in a vehicle lift including a hydraulically actuated ram, a novel platform mountable on the ram for raising the vehicle relative to the ground comprising rectangular tubular frame means having forward extending and rearward extending portions relative to the ram, first tubular support means moveably connected to the frame means at the end of the forward extending portion, and second tubular support means coupled to the frame means at the end of the rearward extending portion, the first and second support means each including two spaced apart bearing surfaces for engaging the vehicle at pre-determined points along the bottom thereof.

According to still another aspect, there is provided a hydraulic lift having an actuating ram, a novel platform mountable on the ram for raising a motor vehicle comprising tubular frame means having a rectangular cross sectional configuration and including front and rear portions extending along a line in opposite directions from the ram, first tubular support means fastened to the frame means at the outer end of the front portion and including two spaced apart bearing surfaces lying along a line substantially orthogonal to and in a plane parallel with the frame means, and a second tubular support means extending partially into the rear portion and pivotly connected to the frame means at a point intermediate the ram and the outer end of the rear portion, the second support means further including two spaced apart bearing surfaces each disposed along a line orthogonal to the center line of the frame means at a predetermined distance therefrom and lying in a plane parallel to the frame means.

It is therefore an object of the invention to provide an improved tubular platform for a vehicle lift.

Another object of the invention is to provide for a vehicle lift an improved platform made up of rectangular tubular stock.

Yet another object of the invention is to provide for mounting on the ram of a vehicle lift a rectangular tubular platform having telescoping front and/or rear supports.

Still another object of the invention is to provide a rectangular tubular platform of the type described having front supports capable of telescoping longitudinally and transversely relative to the frame of the platform.

Another object of the invention is to provide a rectangular tubular platform of the type described wherein the front supports are pivotly mounted to the frame of the platform.

Still another object of the invention is to provide a rectangular tubular platform of the type described wherein the rear supports are pivotly mounted and form a Y-type configuration to provide additional room for servicing a vehicle supported in the raised position.

Yet another object of the invention is to provide a rectangular tubular platform of the type described wherein the rear supports are Y-type tubular extensions welded to the frame.

These and other objects and advantages of the invention will appear and be brought out more fully in the following specification reference being had to the accompanying drawings wherein:

FIGURE 1 is a perspective view of a rectangular tubular platform according to the invention for mounting on the ram of a vehicle lift and shows the preferred front and rear support means;

FIGURE 2 is an enlarged perspective view of the rear portion of a tubular platform of FIGURE 1 showing one of the telescoping support members extended outwardly;

FIGURE 3 is an enlarged partially exploded perspective view of the front portion of the tubular platform of FIGURE 1 showing the support extension spread apart;

FIGURE 4 is a fragmentary view in perspective showing in greater detail the provisions for mounting the tubular platform to the ram as shown in FIGURE 1;

FIGURE 5 is an enlarged perspective view partially in section of an alternate embodiment of the preferred front support means shown in FIGURES 1 and 3;

FIGURE 6 is an enlarged perspective view partially in section of an alternate embodiment of the preferred rear support means shown in FIGURES 1 and 2; and FIGURE 7 is an enlarged perspective view of another alternate embodiment of the preferred rear support means shown in FIGURES 1 and 2.

Referring more particularly to the drawings, shown there in FIGURE 1 is a rectangular tubular platform 10 according to the invention for mounting on the vehicle lift 12 having an actuating mechanism or ram 14 which may be operated hydraulically or with any other suitable means. The platform 12 comprises co-extending front and rear tubular portions 16 and 18 respectively forming a central or main tubular frame 20. The platform 10 also includes a front tubular support structure 22 and a rear tubular suport structure 24 coupled to the frame 20 at outer ends of the corresponding portions 16 and 18.

Regarding the word "tubular," its meaning in the preceding sentence as well as throughout the specification infra, unless otherwise indicated, is intended to be the same as if the word "rectangular" were to precede "tubular."

As best seen in FIGURE 3, a preferred embodiment of the front tubular support structure 22 of FIGURE 1 comprises two parallel spaced apart tubular sections 26a and 26b welded to one of the narow side walls of a transversely directed tubular sction 28 in which are carried two telescoping tubular extensions 30a and 30b. The tubular sections 26a and 26b are supportedly mounted in the frame 20 at the front portion 16. Openings 31 provided in the upper broad wall of the frame 20 along its longitudinal center line form a seat for a ball detent 32 which is centrally located in a bracket 33 connected to the tubular sections 26a and 26b at their ends inside the frame 20. With this arrangement, the operative position of the front tubular support structure 22 may be varied from the closed position shown in FIGURE 1 to an extended position as shown in FIGURE 3. By placing the opening 31 at appropriate points along the center line of the frame 20, the operator or mechanic need only position the ball detent 32 in the appropriate opening 31 to properly locate the front support structure 22 for serving a particular vehicle. Once properly positioned, the interacting force between the ball detent 32 and the seat formed by the particular opening 31 serves to prevent an inadvertent change in position of the front support structure 22 as preparations continue for lifting the vehicle.

The tubular extension 30a is formed from smaller rectangular tubing than that used for the tubular extension 30b, which in turn is likewise smaller than the rectangular tubing used for the tubular section 28. Such an arrangement permits the operator or mechanic to position the bearing plates 34, having rubber pads 35 and mounted at the outer ends of the tubular extension 30a and 30b, so that the vehicle to be raised is properly supported at specific load bearing points. Thus, the preferred tubular support structure 22 is adjustable along two orthogonal directions between the closed position shown in FIGURE 1 and an open or extended position as shown in FIGURE 3. A suitable stop, not shown, similar to the ball detent and seat arrangement previously described, may also be provided in the tubular section 28 to facilitate positioning of the tubular extensions 30a and 30b. Furthermore, for added strength, the lower broad walls 27a and 27b may extend under the tubular section 28 as shown in FIGURE 3 to provide additional points for welding.

As best seen in FIGURE 2, the preferred embodiment of the rear tubular support structure 24 of FIGURE 1 comprises a tubular section 36 and two tubular support members 38 slidably mounted in each end. The tubular section 36 is welded to the frame 20 at the open end of the rear portion 18. A stiffening plate 37 may be provided over the upper broad walls of the rear portion 18 and the tubular section 36 to strengthen the connection. At the outer ends of the tubular members 38 are provided suitable spacers 39 forming a bearing surface which in turn may include a rubber pad 35. The outer ends of the tubular section 36 may be cut at an angle $\theta$ as shown in FIGURE 2, thus providing an underlying supporting surface when the support members 38 are disposed in their closed position as shown in FIGURE 1. A stop, not shown, similar to the ball detent and seat arrangement discussed above in conjunction with FIGURE 2, may also be provided in the tubular section 36 for each of the tubular support members 38.

Though structurally different, the tubular sections 28 and 36 are functionally similar and may therefore be substituted one for the other accordingly as the requirements to be met dictate. The telescoping arrangement of the tubular extensions 30a and 30b is preferred where the associated tubular section 28 is relatively short in length whereas, the sliding arrangement of tubular members 38 is more efficient from the standpoint of costs where the associated tubular section 36 may be somewhat longer in length. Furthermore, there is nothing to prevent the platform 10 of FIGURE 1 from being constructed with the same support structures, i.e. with either the embodiment shown in FIGURE 2 or FIGURE 3, being used at both ends of the frame 20.

The platform 10 may be mounted on the ram 14 of a vehicle lift 12 in the manner shown in FIGURE 4. A stiffening ring 41 is disposed in the frame 20 and concentrically aligned with a base circle along which are drilled a number of openings 42. Conventional fasteners 43, extending through the openings 42 and threadedly received by the ram 14, may be either exposed or, as shown in FIGURE 4, concealed within the frame 20. If desired, a stiffening ring of greater diameter than the base circle may be used in lieu of the stiffening ring 41.

Shown in FIGURE 5 is a second embodiment of the front tubular support structure 22 of FIGURES 1 and 3, hereinafter referred to as front support structure 45. The structure 45 includes two identical tubular sections 46 pivotally mounted to the frame 20 near the outer end of the front portion 16 in a symmetrical manner about the longitudinal center line of the platform 10. The narrow side walls 17 of the frame 20 are cut back to a sufficient amount so that the two tubular sections 46, when positioned as shown in FIGURE 5, form a co-extending line right angles to the longitudinal center line of the frame 20. A center stop plate 47, welded between the broad walls 15 of the frame 20, provides the means for limiting the arc through which each of the tubular sections 46 may be rotated about their respective pivot points formed by pins 48 passing through the broad walls 15 and the broad walls of the tubular sections 46. This range of angular displacement of the tubular sections 46 may, for example, be as shown in dotted delineation by the reference numeral 49.

The support structure 45 further includes bearing surfaces in the form of spacer blocks 50, preferably with rubber mats 35, having a clip 50a. Both the spacer blocks 50 and the clips 50a may be formed from suitable rectangular tubular stock and as a unit slidably mounted on to the tubular extensions 46 to permit the operator or mechanic to lift a motor vehicle at the proper point.

A second embodiment of the rear tubular support structure 24 of FIGURES 1 and 2 is shown in FIGURE 6 and is hereinafter referred to as rear support structure 51. The structure 51 includes two identical tubular extensions 52, each comprising a longitudinally extending tubular portion 53 pivotly mounted in the rear portion 18, a relatively shorter transversely directed tubular portion 54 and an inter-connecting tubular portion 55 forming an angle $\theta$ relative to tubular portion 53. The broad walls of the tubular portions 53, 54 and 55 preferably, though not necessarily, form a co-extending planar surface 56. Known welding techniques may be used to join the tubular portions 53, 54 and 55. Pins 57 extending through openings 61 in the broad walls 15 of the frame 20 and through the broad walls of the tubular portion 53 permit angular displacement of the tubular extension 52. A narrow plate 58 centrally positioned at the end of the rear portion 18 and welded to the broad walls 15 strengthens the structure 51 and serves as a stop limiting the angular movement of the tubular extensions 52 towards the center line of the platform 10. Angular displacement away from the center line is limited by the extent to which the narrow side walls 17 of the rear portion 18 are cut back from the outer end.

As a third embodiment of the rear tubular support structure 24, reference FIGURE 7, the tubular portion 55 may be directly attached as by welding to the open end of the rear tubular portion 18, assuming tubular stock having side walls of comparable width is used. If desired, the tubular extensions 52 shown in FIGURE 6 may, for example, have a shorter tubular portion 53 which may in turn be inserted in the frame 20 and welded directly thereto as an equivalent of the third embodiment shown in FIGURE 6.

As an alternative to the rubber pad 35 and the associated bearing plates 34 or spacer blocks 50, conventional flippers 59 of the retractable type may be mounted on a shaft 60 passing through both narrow walls of the transversely directed tubular portion 54 of the tubular extension 52.

By way of example only, the frame 20 shown in a drawing may be formed from rectangular tubular stock having a nominal dimension of 2" x 10". The sections 28 and 36 in turn may be formed from 2½" x 5" rectangular steel tubing. Similarly, the tubular extension 30b and the tubular members 38 in turn are formed from 2" x 4" rectangular tubing and the tubular extension 30a from 1½" x 3" stock. For the tubular sections 26a, 26b and 46 and the tubular extensions 52 1½" x 4" rectangular steel tubing may be used.

In view of the above, it follows that the new and novel platform 10 may be constructed in a variety of combinations. A preferred and alternate embodiment has been shown and described for the front support structure; as for the rear support structure, three variations including the preferred one has been set forth above. Of course, any one of these five overall variations may be used as both the front and rear support structures in conjunction with the frame 20 to form a particular platform according to the invention.

While I have herein shown and described by invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices and methods.

I claim:

1. In a hydraulic lift having an actuating ram, a platform mountable on said ram for raising a motor vehicle comprising tubular frame means having a rectangular cross-sectional configuration and including front and rear portions extending along a line in opposite directions from said ram; first tubular support means fastened to said frame means at the outer end of said front portion and including two spaced apart bearing surfaces lying along a line substantially orthogonal to and in a plane parallel with said frame means; and second tubular support means extending partially into said rear portion and pivotally connected to said frame means at a point intermediate said ram and the outer end of said rear portion, said second support means further including two spaced apart bearing surfaces each disposed along a line orthogonal to the center line of said frame means at a predetermined distance therefrom and lying in a plane parallel to said frame means.

2. In a hydraulic lift having an actuating ram, a platform mountable on said ram for raising a motor vehicle comprising: tubular frame means of rectangular cross-section and including front and rear portions co-extending in opposite directions from said ram, each of said portions having open outer ends; first tubular support means comprising first and second tubular sections each extending orthogonally relative to the other, said first tubular section extending partially into said frame means at said front open end and moveably positioned therein; bearing surface plates attached at the outer ends of said second tubular sections and falling in a plane parallel to said frame means; and second tubular support means extending partially into said rear portion from said rear open end and pivotly connected to said frame means at points intermediate said ram and said rear open end, said second support means further including two symmetrically spaced apart bearing surface plates each of which falls in a plane parallel to that of said frame means.

3. In a hydraulic lift having an actuating ram, a platform mountable on said ram for raising a motor vehicle comprising: tubular frame means of rectangular cross-section and including front and rear portions co-extending in opposite directions from said ram, each of said portions having open outer ends; first tubular support means comprising first and second tubular sections each extending orthogonally relative to the other, said first tubular section extending partially into said frame means at said front open end and movably positioned therein; a first tubular support extension having a length greater than said second tubular section and movably mounted therein from one side of said first tubular support means; a second tubular support extension slightly shorter in length relative to said first tubular support extension and movably mounted therein from the other side of said first tubular support means; bearing plates for engaging the frame of said motor vehicle attached to said first and second tubular support extension at the outer end thereof and lying in a plane parallel to said frame means; and second tubular support means extending partially into said rear portion from said rear open end and pivotly connected to said frame means at points intermediate said ram and said rear open end, said second support means further including two symmetrically spaced apart bearing surface plates each of which falls in a plane parallel to that of said frame means.

4. In a hydraulic lift having an actuating ram, a platform mountable on said ram for raising a motor vehicle comprising: tubular frame means of rectangular cross-section and including front and rear portions co-extending in opposite directions from said ram, each of said portions having open outer ends; first tubular support means comprising first and second rectangular tubular sections each extending partially into said frame means from opposite sides of said front portion near said front open end and pivotly coupled thereto by a pin, said pins being symmetrically disposed along a line orthogonal to the center-line of said frame means; cleat means including a bearing surface plate slidably mounted on each of said first and second tubular sections for engaging the undercarriage of said motor vehicle to support same in the raised position; stop means including a plate fastened to said frame means across the front open end in the region of said centerline and extending a predetermined amount therefrom to limit the angular movement of said first and second tubular sections; and second tubular support means extending partially into said rear portion from said rear open end and pivotly connected to said frame means at points intermediate said ram and said rear open end, said second support means further including two symmetrically spaced apart bearing surface plates each of which falls in a plane parallel to that of said frame means.

5. In a hydraulic lift having an actuating ram, a platform mountable on said ram for raising a motor vehicle comprising: tubular frame means having a rectangular cross-sectional configuration and including front and rear portion extending along a line in opposite directions from said ram; first tubular support means fastened to said frame means at the outer end of said front portion and including two spaced apart bearing surfaces lying along a line substantially orthogonal to and in a plane parallel with said frame means; second rectangular tubular support means fastened at a side wall thereof to said frame means at the outer end of said rear portion in the plane of said frame means along a line orthogonal to the centerline thereof; two rectangular tubular support members slideably mounted in said support means from the opposite ends thereof; and bearing plates attached to each of said support members at the outer ends thereof for engaging the frame of said motor vehicle, said plates lying in a plane parallel to said frame means.

6. In a hydraulic lift having an actuating ram, a platform mountable on said ram for raising a motor vehicle comprising: tubular frame means of rectangular cross-section and including front and rear portions coextending in opposite directions from said ram, each of said portions having open outer ends; first tubular support means comprising first and second tubular sections each extending orthogonally relative to the other, said first tubular section extending partially into said frame means at said front open end and moveably positioned therein; bearing surface plates attached at the outer ends of said second tubular sections and falling in a plane parallel to said frame means; second rectangular tubular support means fastened at a side wall thereof to said frame means at the outer end of said rear portion in the plane of said frame means along a line orthogonal to the centerline thereof; two rectangular tubular support members slideably mounted in said support means from the opposite ends thereof; and bearing plates attached to each of said support members at the outer ends thereof for engaging the frame of said motor vehicle, said plates lying in a plane parallel to said frame means.

7. In a hydraulic lift having an actuating ram, a platform mountable on said ram for raising a motor vehicle comprising: tubular frame means of rectangular cross-section and including front and rear portions coextending in opposite directions from said ram, each of said portions having open outer ends; a first tubular support extension having a length greater than said second tubular section and moveably mounted therein from one side of said first tubular support means; a second tubular support extension slightly shorter in length relative to said first tubular support extension and movably mounted therein from the other side of said first tubular support means; bearing plates for engaging the frame of said motor vehicle attached to said first and second tubular support extensions at the outer end thereof and lying in a plane parallel to said frame means; second rectangular tubular support means fastened at a side wall thereof to said frame means at the outer end of said rear portion in the plane of said frame means along a line orthogonal to the centerline thereof; two rectangular tubular support members slideably mounted in said support means from the opposite ends thereof; and bearing plates attached to each of said support members at the outer ends thereof for engaging the frame of said motor vehicle, said plates lying in a plane parallel to said frame means.

8. In a hydraulic lift having an actuating ram, a platform mountable on said ram for raising a motor vehicle comprising: tubular frame means of rectangular cross-section and including front and rear portions coextending in opposite directions from said ram, each of said portions having open outer ends; first tubular support means comprising first and second rectangular tubular sections each extending partially into said frame means from opposite sides of said front portion near said front open end and pivotly coupled thereto by a pin, said pins being symmetrically disposed along a line orthogonal to the centerline of said frame means; cleat means including a bearing surface plate slideably mounted on each of said first and second tubular sections for engaging the undercarriage of said motor vehicle to support same in the raised position; stop means including a plate fastened to said frame means across the front open end in the region of said centerline and extending a predetermined amount therefrom to limit the angular movement of said first and second tubular sections; second rectangular tubular support means fastened at a side wall thereof to said frame means at the outer end of said rear portion in the plane of said frame means along a line orthogonal to the centerline thereof; two rectangular tubular support members slideably mounted in said support means from the opposite ends thereof; and bearing plates attached to each of said support members at the outer ends thereof for engaging the frame of said motor vehicle, said plates lying in a plane parallel to said frame means.

9. In a hydraulic lift having an actuating ram, a platform mountable on said ram for raising a motor vehicle comprising tubular frame means having a rectangular cross-sectional configuration and including front and rear portions extending along a line in opposite directions from said ram; first tubular support means fastened to said frame means at the outer end of said front portion and including two spaced apart bearing surfaces lying along a line substantially orthogonal to and in a plane parallel with said frame means; second rectangular tubular support means comprising two angularly disposed extensions each mechanically coupled to said frame means at the outer end of said rear portion, said angular extensions being arranged symmetrically about the centerline of said frame means and extending outwardly therefrom in Y-type configuration; and a retractable plate element associated with each of said two angular extensions near the outer ends thereof to provide an unobstructed region therebetween, said retractable plate elements being pivotly mounted on pins extending through the corresponding angular extension and along lines parallel to said centerline, said retractable plate elements being disposed to their upright operable position to engage the undercarriage of said motor vehicle when raising the same.

10. In a hydraulic lift having an actuating ram, a platform mountable on said ram for raising a motor vehicle comprising: tubular frame means of rectangular cross-section and including front and rear portions coextending in opposite directions from said ram, each of said portions having open outer ends; first tubular support means comprising first and second tubular sections each extending orthogonally relative to the other, said first tubular section extending partially into said frame means at said front open end and moveably positioned therein; bearing surface plates attached at the outer ends of said second tubular sections and falling in a plane parallel to said frame means; second rectangular tubular support means comprising two angularly disposed extensions each mechanically coupled to said frame means at the outer end of said rear portion, said angular extensions being arranged symmetrically about the centerline of said frame means and extending outwardly therefrom in Y-type configuration; and a retractable plate element associated with each of said two angular extensions near the outer ends thereof to provide an unobstructed region therebetween, said retractable plate elements being pivotly mounted on pins extending through the corresponding angular extension and along lines parallel to said centerline, said retractable plate elements being disposed to their upright operable position to engage the undercarriage of said motor vehicle when raising the same.

11. In a hydraulic lift having an actuating ram, a platform mountable on said ram for raising a motor vehicle comprising: tubular frame means of rectangular cross-section and including front and rear portions co-extending in opposite directions from said ram, each of said portions having open outer ends; a first tubular support extension having a length greater than said second tubular section and moveably mounted therein from one side of said first tubular support means; a second tubular support extension slightly shorter in length relative to said first tubular support extension and moveably mounted therein from the other side of said first tubular support means; bearing plates for engaging the frame of said motor vehicle attached to said first and second tubular support extensions at the outer end thereof and lying in a plane parallel to said frame means; second rectangular tubular support means comprising two angularly disposed extensions each mechanically coupled to said frame means at the outer end of said rear portion, said angular extensions being arranged symmetrically about the centerline of said frame means and extending outwardly therefrom in Y-type configuration; and a retractable plate element associated with each of said two angular extensions near the outer ends thereof to provide an unobstructed region therebetween, said retractable plate elements being pivotly mounted on pins extending through the corresponding angular extension and along lines parallel to said centerline, said retractable plate elements being disposed to their upright operable position to engage the undercarriage of said motor vehicle when raising the same.

12. In a hydraulic lift having an actuating ram, a platform mountable on said ram for raising a motor vehicle comprising: tubular frame means of rectangular cross-section and including front and rear portions co-extending in opposite directions from said ram, each of said portions having open outer ends; first tubular support means comprising first and second rectangular tubular sections each extending partially into said frame means from opposite sides of said front portion near said front open end and pivotly coupled thereto by a pin, said pins being symmetrically disposed along a line orthogonal to the centerline of said frame means; cleat means including a bearing surface plate slidably mounted on each of said first and second tubular sections for engaging the undercarriage of said motor vehicle to support same in the raised position; stop means including a plate fastened to said frame means across the front open end in the region of said centerline and extending a predetermined amount therefrom to limit the angular movement of said first and second tubular sections; second rectangular tubular support means comprising two angularly disposed extensions each mechanically coupled to said frame means at the outer end of said rear portion, said angular extensions being arranged symmetrically about the centerline of said frame means and extending outwardly therefrom in Y-type configuration; and a retractable plate element associated with each of said two angular extensions near the outer ends thereof to provide an unobstructed region therebetween, said retractable plate elements being pivotly mounted on pins extending through the corresponding angular extension and along lines parallel to said centerline, said retractable plate elements being disposed to their upright operable position to engage the undercarriage of said motor vehicle when raising the same.

13. In a hydraulic lift having an actuating ram, a platform mountable on said ram for raising a motor vehicle comprising tubular frame means having a rectangular cross-sectional configuration and including front and rear portion extending along a line in opposite directions from said ram; first tubular support means fastened to said frame means at the outer end of said front portion and including two spaced apart bearing surfaces lying along a line substantially orthogonal to and in a plane parallel with said frame means; second rectangular tubular support means pivotly mounted to said frame means intermediate said ram and the outer end of said rear portion; said second support means comprising two angular extensions each forming a mirror image of the other and including a mounting portion extending partially into said frame means and receiving a pin therethrough about which pins the corresponding angular extensions rotate through a predetermined arc, each of said angular extensions further including a central portion extending at an angle from said mounting portion and from the centerline of said frame means and terminating at a load engaging outer portion, each of said pins lying equidistantly from said centerline and along a line orthogonal thereto; and retractable plate elements associated with each of said angular extensions and pivotly mounted on a shaft extending through said load engaging outer portions, along a line parallel to said centerline and at like distance therefrom, said retractable plate elements being adapted to engage the undercarriage of said motor vehicle when disposed in the upright operable position to raise said vehicle.

14. In a hydraulic lift having an actuating ram, a platform mountable on said ram for raising a motor vehicle comprising: tubular frame means of rectangular cross-section and including front and rear portions co-extending in opposite directions from said ram, each of said portions having open outer ends; first tubular support means comprising first and second tubular sections each extending orthogonally relative to the other, said first tubular section extending partially into said frame means at said front open end and moveably positioned therein; bearing surface plates attached at the outer ends of said second tubular sections and falling in a plane parallel to said frame means; second rectangular tubular support means pivotly mounted to said frame means intermediate said ram and the outer end of said rear portion; said second support means comprising two angular extensions each forming a mirror image of the other and including a mounting portion extending partially into said frame means and receiving a pin therethrough about which pins the corresponding angular extensions rotate through a predetermined arc, each of said angular extensions further including a central portion extending at an angle from said mounting portion and from the centerline of said frame means and terminating at a load engaging outer portion, each of said pins lying equidistantly from said centerline and along a line orthogonal thereto; and retractable plate elements associated with each of said angular extensions and pivotly mounted on a shaft extending through said load engaging outer portions, along a line parallel to said centerline and at like distance therefrom, said retractable plate elements being adapted to engage the undercarriage of said motor vehicle when disposed in the upright operable position to raise said vehicle.

15. In a hydraulic lift having an actuating ram, a platform mountable on said ram for raising a motor vehicle comprising: tubular frame means of rectangular cross-section and including front and rear portions coextending in opposite directions from said ram, each of said portions having open outer ends; a first tubular support extension having a length greater than said second tubular section and moveably mounted therein from one side of said first tubular support means; a second tubular support extension slightly shorter in length relative to said first tubular support extension and movably mounted therein from the other side of said first tubular support means; bearing plates for engaging the frame of said motor vehicle attached to said first and second tubular support extension at the outer end thereof and lying in a plane parallel to said frame means; second rectangular tubular support means pivotly mounted to said frame means intermediate said ram and the outer end of said rear portion; said second support means comprising two angular extensions each forming a mirror image of the other and including a mounting portion extending partially into said frame means and receiving a pin therethrough about which pins the corresponding angular extensions rotate through a predetermined arc, each of said angular extensions further including a central portion extending at an angle from said mounting portion and from the centerline of said frame means and terminating at a load engaging outer portion, each of said pins lying equidistantly from said centerline and along a line orthogonal thereto; and retractable plate elements associated with each of said angular extensions and pivotly mounted on a shaft extending through said load engaging outer portions, along a line parallel to said centerline and at angular extensions rotate through a predetermined arc, like distance therefrom, said retractable plate elements being adapted to engage the undercarriage of said motor vehicle when disposed in the upright operable position to raise said vehicle.

16. In a hydraulic lift having an actuating ram, a platform mountable on said ram for raising a motor vehicle comprising: tubular frame means of rectangular cross-section and including front and rear portions co-extending in opposite directions from said ram, each of said portions having open outer ends; first tubular support means comprising first and second rectangular tubular sections each extending partially into said frame means from opposite sides of said front portion near said front open end and pivotly coupled thereto by a pin, said pins being symmetrically disposed along a line orthogonal to the centerline of said frame means; cleat means including a bearing surface plate slidably mounted on each of said first and second tubular sections for engaging the undercarriage of said motor vehicle to support same in the raised position; stop means including a plate fastened to said frame means across the front open end in the region of said centerline and extending a predetermined amount therefrom to limit the angular movement of said first and second tubular sections; second rectangular tubular support means pivotly mounted to said frame means intermediate said ram and the outer end of said rear portion; said second support means comprising two angular extensions each forming a mirror image of the other and including a mounting portion extending partially into said frame means and receiving a pin therethrough about which pins the corresponding each of said angular extensions further including a central portion extending at an angle from said mounting portion and from the centerline of said frame means and terminating at a load engaging outer portion, each of said pins lying equidistantly from said centerline and along a line orthogonal thereto; and retractable plate elements associated with each of said angular extensions and pivotly mounted on a shaft extending through said load engaging outer portions, along a line parallel to said centerline and at like distance therefrom, said retractable plate elements being adapted to engage the undercarriage of said motor vehicle when disposed in the upright operable position to raise said vehicle.

17. The platform in accordance with claim 5 characterized in that one of said two tubular support members is slightly smaller in rectangular cross-section than the other for slidably mounting in said other tubular support member.

18. The platform in accordance with claim 7 characterized in that one of said two tubular support members is slightly smaller in rectangular cross-section than the other for slidably mounting in said other tubular support member.

References Cited

FOREIGN PATENTS 768,388    2/1957    Great Britain.
1,065,594    9/1959    Germany.

EVON C. BLUNK, *Primary Examiner.*

H. C. HORNSBY, *Assistant Examiner.*

UNITED STATES PATENT OFFICE
CERTIFICATE OF CORRECTION

Patent No. 3,330,382                                    July 11, 1967

Oscar Carlson

It is certified that error appears in the above identified patent and that said Letters Patent are hereby corrected as shown below:

Column 11, line 1, cancel "angular extensions rotate through a predetermined arc," and insert the same before "each" in line 1, Column 12.

Signed and sealed this 12th day of August 1969.

(SEAL)
Attest:

Edward M. Fletcher, Jr.                        WILLIAM E. SCHUYLER, JR.
Attesting Officer                                        Commissioner of Patents